United States Patent [19]

Nakamura et al.

[11] Patent Number: 4,725,721
[45] Date of Patent: Feb. 16, 1988

[54] AUTOFOCUSING CONTROL SYSTEM

[75] Inventors: Shigeru Nakamura, Hachioji; Yoshito Tsunoda, Mitaka; Takeshi Maeda, Kokubunji, all of Japan

[73] Assignee: Hitachi, Ltd., Tokyo, Japan

[21] Appl. No.: 766,271

[22] Filed: Aug. 16, 1985

[30] Foreign Application Priority Data

Aug. 17, 1984 [JP] Japan .................. 59-170416

[51] Int. Cl.⁴ .................................. G11B 7/09
[52] U.S. Cl. ....................... 250/201; 354/406; 369/106; 369/45
[58] Field of Search ............. 250/201 AF, 201 PF, 250/201 DF, 201 R, 204, 211 R, 237 R, 578, 226; 354/404, 406, 407, 408; 356/1, 4; 369/106, 44–46

[56] References Cited

U.S. PATENT DOCUMENTS

| 4,243,848 | 1/1981 | Utsumi ................... 369/45 |
| 4,365,323 | 12/1982 | Heemskerk et al. ........ 250/201 DF |
| 4,368,526 | 1/1983 | Harigae et al. .......... 369/45 |
| 4,450,547 | 5/1984 | Nakamura et al. ......... 250/204 |
| 4,532,619 | 7/1985 | Sugiyama et al. ......... 369/106 |
| 4,600,831 | 7/1986 | Hutley .................. 250/226 |

FOREIGN PATENT DOCUMENTS

| 0098076 | 1/1984 | European Pat. Off. . |
| 3346812 | 8/1984 | Fed. Rep. of Germany . |
| 0054644 | 5/1981 | Japan .................. 369/106 |
| 2131576 | 6/1984 | United Kingdom . |

*Primary Examiner*—Edward P. Westin
*Assistant Examiner*—Charles Wieland
*Attorney, Agent, or Firm*—Antonelli, Terry & Wands

[57] ABSTRACT

An autofocusing control system makes a position of focusing spot follow for itself a displacement of an information medium. In the autofocusing control system, a single mode semiconductor laser is excited in a multi oscillation mode by returning part of a reflected light beam from the information medium, and a focusing lens having chromatic aberration is used which focuses a laser beam from the semiconductor laser onto a different position along the optical axis of the lens in association with a different laser wavelength.

13 Claims, 10 Drawing Figures

AUTOFOCUSING CONTROL SYSTEM

BACKGROUND OF THE INVENTION

The present invention relates to an autofocusing control system for optical information processing apparatus, and more particularly to an autofocusing control system suitable for use with an optical head for an optical disc device.

In a conventional autofocusing control system for an optical head of an optical disc device, autofocusing control has been made by detecting a displacement of a spot relative to the disc and mechanically moving the focusing lens in accordance with the displacement. Therefore, high precision has been required for the detection performance of a focal displacement detection means and for the response performance of a focusing lens drive means. A more detailed description therefor will be given with reference to FIG. 1 which shows one example of a conventional autofocusing control sytem for an optical head. Light radiated from a semiconductor laser 1 is changed into parallel rays of light at a collimating lens 2. The parallel beam is focused as a spot 4 on a disc 5 by means of a focusing lens 3 having a numerical aperture (NA) of 0.5. Reflected light passes through a λ/4 plate 6 and a polarizing beam splitter 7 and is guided to a known focal displacement detection means comprising for example a convex lens 8, a cylindrical lens 9, a knife-edge 10, a 2-divided light detector 11 and a differential circuit 12. The detailed explanation for the detection principle of the detection means is omitted since it is not related to this invention. The focal displacement detection system is disclosed in U.S. Pat. No. 4,450,547. If the disc 5 is positioned at the spot 4, a detection signal 14 of a zero level is outputted. However, if the disc is displaced to a position represented by a reference 5', the reflected light deviates from the parallel beam after passing the lens 3 as shown by broken lines 13. Thus, the differential circuit 12 outputs a detection signal 14 of a certain positive or negative voltage level corresponding to the direction and the amount of the displacement of the disc. In FIG. 2, a solid line 17 shows a relation between the displacement amount of the disc and the output voltage 14 of the differential circuit 12, wherein the abscissa 15 denotes the displacement amount and the ordinate 16 denotes the output voltage 14. Not only the detection means described above, but also most of other focal displacement detection means output a detection signal as shown in FIG. 2. In response to this detection signal 14, the lens 3 is moved in the disc displacement direction by an electromagnetic drive means 18 utilizing for example a voice coil of a loudspeaker.

To stably record or reproduce information on the disc, it is necessary to set the displacement between the spot and the disc within the range of about $$\pm \tfrac{1}{2} \tfrac{\lambda}{NA^2} = \pm 1\ \mu m.$$

assuming that the numerical aperture of the focusing lens NA=0.5 and the wavelength λ=0.83 μm. According to the prior art autofocusing control system, in case the disc displaces about ±1 μm, the focal displacement detection means must output a detection signal sufficient for the lens drive means 18 to move the lens 3 at a proper speed and force. Furthermore, while the disc 5 is located within the range of ±0.2 to 0.4 μm relative to the spot 4 position, it is necessary to prepare an initial setting adjustment of a target for the focal displacement detection means in such a manner that the detection signal becomes zero level.

In addition, the lens drive means 18 is required to have such high quality response characteristic as the autofocusing control system, as a whole, controls the displacement between the spot 4 and the disc 5 to be limited always within about ±1 μm.

As seen from the foregoing, the prior art autofocusing control system has simply employed a method of mechanically moving the focusing lens in order to correct the displacement between the spot 4 and the disc 5. Therefore, such system is associated with some problems that highly precise detection sensitivity and initial setting adjustment for the focal displacement detection means are necessary, as well as a good response characteristic for the lens drive means.

SUMMARY OF THE INVENTION

The present invention seeks to provide a high quality autofocusing control system capable of retaining a small displacement between a spot and the surface of an information medium, without necessitating a need for highly precise detection sensitivity and initial setting adjustment for a focal displacement detection means as well as a good response characteristic for a focal displacement correction means.

According to the present invention, attention has been directed to two facts: that a semiconductor laser oscillates in a multi mode if part of a reflected light from an information medium is returned to the semiconductor laser; and that a focusing lens having chromatic aberration changes the position of a spot with a change of the wavelength. By virtue of the combined two facts, the present invention enables to eliminate the prior art drawbacks and enjoys an advantageous effect that the position of a focused spot follows for itself a displacement of an information medium within the range of several μm.

DESCRIPTION OF THE PREFERRED EMBODIMENTS

Figure 1:
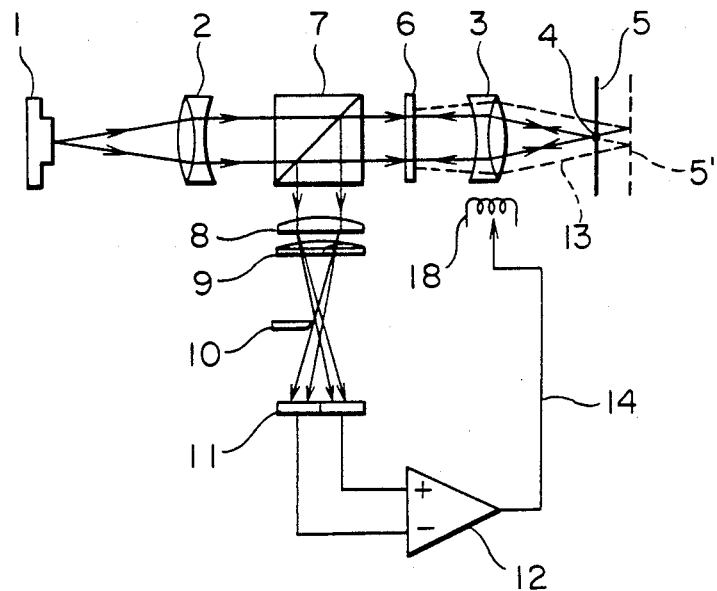
FIG. 1 illustrates one example of a prior art autofocusing control system for use with an optical head of an optical disc.
Figure 2:
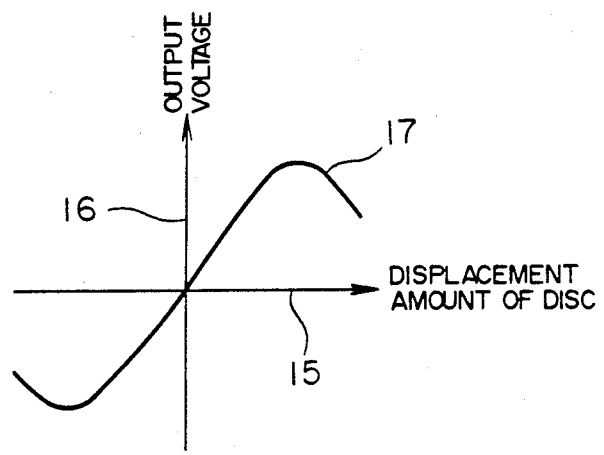
FIG. 2 is a graph for explaining an output signal from the focal displacement detection means shown in FIG. 1.

An embodiment of this invention will now be described with reference to FIG. 3 which shows an example of an autofocusing control system applied to an optical head of an optical disc device. Light radiated from a semiconductor laser 1 is changed into parallel rays of light at a collimating lens 2. The parallel beam is focused as a spot S3 on a disc 5 by means of a focusing lens 20 having an NA of 0.5. Part of a reflected light from the disc 5 is transmitted a translucent mirror 21 having a determined transmittance and reflectance and is returned to the semiconductor laser 1, while the remainder of the light is reflected and guided to a focal displacement detection means. To derive from the optical disc an information reproduction signal and a tracking signal for the control of a laser beam spot, a beam splitter is positioned intermediately between the translucent mirror 21 and the convex lens 8 to divide the reflected light from the optical disc into two parts. By detecting one of them with a 2-divided light detector for example, it is possible to obtain a reproduction signal from the addition output of the 2-divided light detector and a tracking signal from the subtraction output. However, the above arrangement is omitted from FIG. 3 since the gist of this invention is not related thereto. The semiconductor laser 1 is preferably a single mode semiconductor laser. The single mode semiconductor laser can oscillate at different modes differing in wavelength from each other by $\Delta\lambda = \lambda^2/2nL$ relative to a center wavelength $\lambda$, wherein L represents a distance between opposite reflection end facets of the laser chip and n represents a refractive index of the active layer. A semiconductor laser itself produces the most powerful oscillation at a mode matching the internal resonator constructed of the opposite reflection end facets of the laser chip. However, if part of the radiated laser light is returned to the laser as in the case of the present embodiment, the laser and the disc constitutes an external resonator so that the most powerful oscillation occurs at a mode having a wavelength most likely to be returned to the laser active layer. It was found satisfactory so long as the quantity of returned light exceeds 0.5% of the radiated laser light assuming the numerical aperture of the collimating lens 2 is 0.25. Alternatively, a laser which oscillates for itself in a multi oscillation mode, is not suitable for the present invention since such a laser shows no shift of the oscillation wavelength even when light is returned thereto. FIG. 4B shows a spectrum of the semiconductor laser 1 to which light is returned. It is assumed that the oscillation ranges over a wavelength of $\lambda 1$ to $\lambda 15$. The separation $\Delta\lambda$ between respective wavelengths is in the order of 0.33 nm with the assumption of $\lambda = 0.83$ μm, $n = 3.5$, and $L = 300$ μm. Furthermore, according to another aspect of the present invention, the focusing lens 20 has a relatively large chromatic aberration, whereas an achromatic lens has been used heretofore. FIG. 4A shows the spot positions S1 to S15 of the focusing lens 20 with chromatic aberration, wherein the spot position S1 corresponds to a wavelength $\lambda 1$, spot position S2 corresponds to $\lambda 2$, ... spot position S15 corresponds to $\lambda 15$. Now it is assumed that the disc 5 is positioned near the spot position S3. Then, a laser beam of a wavelength $\lambda 3$ among other beams is returned to the semiconductor laser 1 to a large degree. Therefore, the oscillation spectrum of the semiconductor laser 1 becomes as shown in FIG. 4B with the oscillation concentrated about the wavelength $\lambda 3$. Thus, the laser spot concentrates substantially on the position S3, that is, on the disc 5. If the disc is displaced to the position 5' which is near the spot position S6 corresponding to the wavelength $\lambda 6$, then a laser beam of a wavelength $\lambda 6$ among other beams is returned to the semiconductor laser to a large degree. Therefore, the oscillation spectrum becomes as shown in FIG. 4C with the oscillation concentrated about the wavelength $\lambda 6$. Thus, the laser spot substantially moves and follows the disc displacement, as from the position S3 to S6. Representing the numerical aperture of the focusing lens 20 by NA, then the focal depth is given by $$\frac{\lambda}{NA^2}.$$

If the disc displacement is within $$\pm \tfrac{1}{2} \frac{\lambda}{NA^2}$$

from the spot position S6 to which the laser beam oscillated at a wavelength $\lambda 6$ is focused, the wavefront aberration of the returning beam to the laser is smaller than $\lambda/4$. The returning beam to be focused by a coupling lens to a laser end facet is subjected to practically no reduction (about 20%) in its energy density. As a result, the laser can continue its oscillation at a wavelength $\lambda 6$ and the recording and reproduction of information can be stably performed. With $NA = 0.5$, the disc displacement is within $\pm 0.83$ μm. If the disc displacement exceeds this range, the oscillation mode at a wavelength $\lambda 6$ becomes unstable. However, if the distance between spot positions S1, S2, S3, . . . is $$\tfrac{1}{2} \frac{\lambda}{NA^2} = 1.66 \text{ μm}$$

and the disc displacement exceeds $\pm 0.83$ μm, the oscillation mode shifts to that of a wavelength $\lambda 5$ or $\lambda 7$ to continue a stable recording and reproduction. Therefore, the distance between spot positions S1, S2, . . . is preferably within $$\tfrac{1}{2} \frac{\lambda}{NA^2}.$$

In addition, since the wavelength separation $\Delta\lambda$ is about 0.33 nm, as to the chromatic aberration quantity of the focusing lens, it is sufficient if the focal displacement is within $$\tfrac{1}{2} \frac{\lambda}{NA^2} \text{ μm} \div 0.33 \approx \tfrac{3}{2} \frac{\lambda}{NA^2} \text{ μm} \approx 5 \text{ μm}$$

per wavelength shift 1 nm. Furthermore, if 0.5% of the light is returned, the laser is available of about 15 wavelength modes each different in wavelength by $\Delta\lambda$ relative to the center wavelength. Therefore, a stable recording and reproduction can be performed over the maximum disc displacement range of about $\pm 12$ μm.

According to the prior art, the allowable precision is about $$\pm \tfrac{1}{2} \frac{\lambda}{NA^2} = 1 \text{ μm}.$$

However, according to the present invention, to cover the displacement of over $$\pm 2.5 \times \tfrac{1}{2} \frac{\lambda}{NA^2} = \pm 2.7 \text{ μm},$$

the corresponding displacement of the laser spot becomes over $$\pm 1.5 \times \frac{1}{3} \frac{\lambda}{NA^2} = \pm 1.6 \ \mu m.$$

In case 0.5 to 1% of the light is returned to the semiconductor laser 1, since about 15 different wavelength modes each separated by $\Delta\lambda \div 0.33$ nm are possible, as to the chromatic aberration of the focusing lens 20, it is required that the focal position changes more than $$2 \times \frac{1}{3} \frac{\lambda}{NA^2} = 3.3 \ \mu m$$

against a wavelength shift of 0.33 nm $\times$ 15 = 5 nm. That is, the chromatic aberration more than $$0.6 \ \mu m/nm \left( \approx \frac{1}{5} \frac{\lambda}{NA^2} \right)$$

is required. In case 1 to 5% of the light is returned, since about 30 modes are possible, as to the chromatic aberration of the focusing lens, it is required that the focal displacement is more than $$0.3 \ \mu m/nm \left( \approx \frac{1}{10} \frac{\lambda}{NA^2} \right)$$

per wavelength shift of 1 nm. If the returning light is more than 5%, since about 60 modes are possible, as to the chromatic aberration of the focusing lens, it is required that the focal displacement is more than $$0.1 \ \mu m/nm \left( = \frac{1}{20} \frac{\lambda}{NA^2} \right)$$

per wavelength shift of 1 nm.

The quantity of returning light may properly be set by changing the transmittance and reflectance of the translucent mirror 21. Although a translucent mirror has been employed in the present embodiment, it is apparent that a translucent prism is also applicable. Furthermore, instead of a translucent mirror, a desired quantity of returning light may be obtained by using a combination of a $\lambda/4$ plate and a polarizing prism and either by rotating the $\lambda/4$ plate about the axis of the optical system or by disposing it slantwise relative to the optical axis. The chromatic aberration of the focusing lens 20 can be estimated from $\Delta f = -f/\nu$, wherein f represents a focal length of the lens 20 and $\nu$ represents an Abbe number determined by lens material; optical glass of $\nu = 30$ to 60 for the wavelength difference 0.17 $\mu m$ between F line and D line is commonly used. $\Delta f = -150 \ \mu m$ for f=4.5 mm and $\nu = 30$ is rearranged in the form of $|\Delta f| = 0.88 \ \mu m$ per wavelength difference 1 nm. The focusing lens 20 is made of a combination of plural convex and concave lenses. In this case, by using material with a small $\nu$ for the convex lenses and material with a large $\nu$ for the concave lenses, it is easy to manufacture a lens which changes a focal position by about 1 $\mu m$ with a wavelength shift of 1 nm.

Figure 5:
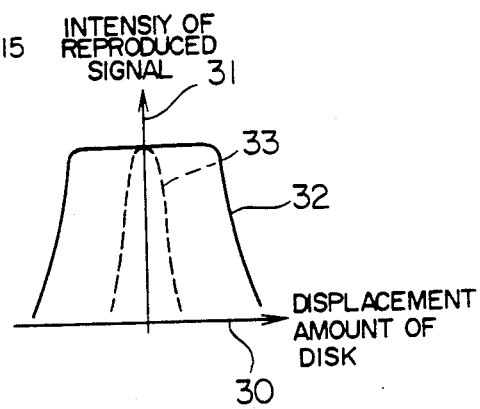
FIG. 5 is a graph illustrating a change of reproduced signal intensity relative to a disc displacement.
Figure 6:
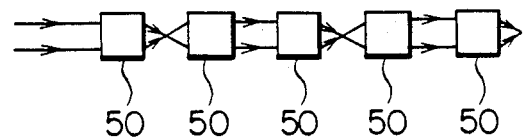
FIGS. 6, 7 and 8 are views showing the main part of a focusing system according to the other embodiments of this invention.
Figure 7:
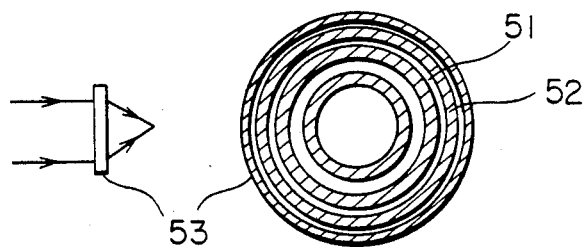
Figure 8:
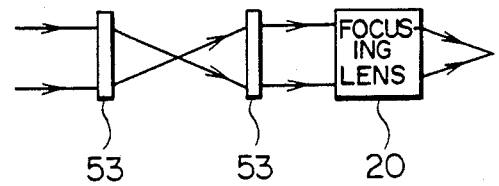

Five combination lenses 50 each constructed as above and disposed in a manner shown in FIG. 6 enable to displace a focal position by 5 $\mu m$ for a wavelength shift of 1 nm. Therefore, the lens shown in FIG. 6 can be used as the focusing lens 20 shown in FIG. 3. Instead of the lens 20 shown in FIG. 3, it is possible to use a Fresnel zone plate lens 53 shown in FIG. 7 which differs in phase by $\lambda/2$ at the regions 51 and 52. With this lens 53, $|\Delta f| \div 5 \ \mu m$ is given from $$\frac{\Delta f}{f} \approx -\frac{\Delta \lambda}{\lambda}$$

assuming the wavelength difference $\Delta\lambda = 1$ nm (for $\lambda = 0.83 \ \mu m$, f=4.5 mm). A hologram lens with a large chromatic aberration is also applicable. Furthermore, it is possible to use Fresnel zone plate lenses 53 or hologram lenses by disposing such lenses between the translucent mirror 21 and the focusing lens 20 as shown in FIG. 8. Laser spots as discussed above can move by about $\pm 12 \ \mu m$ following the disc displacement on condition that 0.5 to 1% of the light is returned and that the chromatic aberration of the focusing lens is set at 5 $\mu m/nm$. Within such range, a focusing state is maintained even with a disc displacement so that no reduction in a reproduction signal occurs. The above range may be set as desired by changing the quantity of returning light and chromatic aberration of the focusing lens as previously explained. The graph of FIG. 5 uses the abscissa as the disc displacement amount and the ordinate as the reproduction signal intensity. A solid line 32 stands for an optical head in the present embodiment, and a broken line 33 stands for an optical head in the prior art. With the prior art optical head, the reduction in a reproduction signal is in the order of 1 dB for a disc displacement of $\pm 1 \ \mu m$ if the electrical focal displacement correction means 18 is not operated. However, with the optical head applied to the present invention, as shown by the solid line 32, no reduction in a reproduction signal occurs within a disc displacement of $\pm 12 \ \mu m$ even if the electrical focal displacement correction means 18 is not operated, thus enabling to attain stable signal reproduction.

As seen from the foregoing, the apparently different points of this embodiment from the prior art system are that part of a laser beam is returned to the semiconductor laser and a focusing lens with chromatic aberration is utilized. By virtue of this arrangement, it is advantageous in that the spot follows for itself the disc displacement within $\pm 12 \ \mu m$ by changing the oscillation wavelength of the semiconductor laser, thereby realizing high precision autofocusing control.

Figure 3:
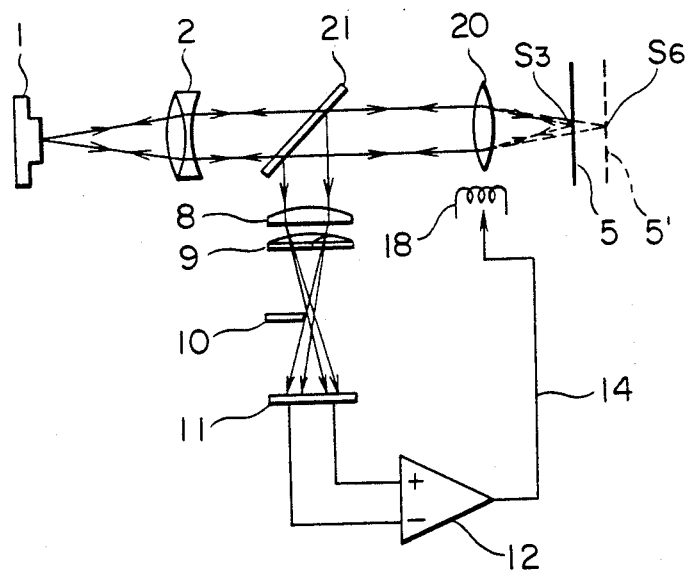
FIG. 3 is a system diagram of this invention applied to an optical head of an optical disc.
Figure 4A:
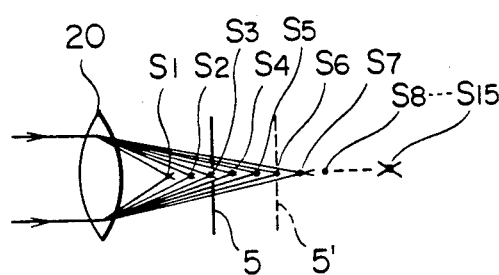
FIGS. 4A to 4C each show a relation between oscillation wavelength and focused spot position with respect to the semiconductor laser shown in FIG. 3.
Figure 4B:
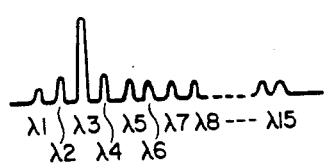
Figure 4C:
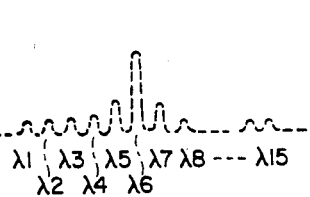

Therefore, it is sufficient only if the displacement between the spot and disc is limited within about $\pm 12 \ \mu m$, through the use of, as shown in FIG. 3, a known focal displacement detection means comprising the convex lens 8, cylindrical lens 9, knife-edge 10, 2-divided light detector 11 and differential circuit 12, and a known drive means for moving the lens 20 in response to a focal displacement detection signal 14. Accordingly, it is sufficient if the detection sensitivity of the focal displacement detection means is one tenth of that of the prior art. Furthermore, it is not necessary to conduct an initial setting adjustment of a target which makes a detection signal zero level while the disc is at a focused position and a returning light is not given to the laser. Also, a high performance of the response characteristic of the lens drive means 18 is not required.

As seen from the foregoing description of this embodiment, since the position of a focused spot follows for itself a displacement of the disc within the range of about ±12 μm, it is possible to realize high precision autofocusing control without using a high performance focal displacement detection means and focusing lens drive means.

As appreciated from the foregoing, in the present invention part of a reflected light from an information medium is returned to a single mode semiconductor laser, and a focusing lens having chromatic aberration focuses a spot at a different position corresponding to a different wavelength, thus enabling to make the position of a focused spot follow for itself a disc displacement more than several μm. Therefore, the detection sensitivity of the focal displacement means may be one third of that of the prior art, and the range of target initial setting adjustment may be 3 times as broad as that of the prior art detection means. Furthermore, it is effective that a high precision autofocusing control is realized without necessitating a high performance of the focal displacement correction means such as a focusing lens drive means, when compared with the prior art.

We claim:
1. An autofocusing control system comprising:
   a single mode semiconductor laser; and
   a focusing lens for focusing as a spot a light beam irradiated from said semiconductor laser onto an information medium;
   wherein at least part of reflected light beam from said information medium is returned to said semiconductor laser, and said focusing lens has chromatic aberration and focuses said spot onto a different position along the optical axis of said focusing lens in association with a different laser wavelength; and
   wherein said semiconductor laser emits initially more strongly a laser of a first layer wavelength, said semiconductor laser being responsive to the part of the reflected light beam from said information medium being returned thereto for emitting more strongly a laser of a different wavelength when a displacement occurs between said spot and the surface of said information medium.

2. An autofocusing control system according to claim 1, wherein said focusing lens focuses said spot onto a different position along the optical axis of said focusing lens in association with the different laser wavelength emitted from said semiconductor laser so as to correct for displacement between said spot and the surface of said information medium.

3. An autofocusing control system according to claim 2, further comprising focal displacement detection means for detecting a coarse displacement between said spot and the surface of said information medium, and focal displacement correction means responsive to an output signal from said focal displacement detection means for correcting the coarse displacement between said spot and the surface of said information medium.

4. An autofocusing control system comprising: a single mode semiconductor laser; a focusing lens for focusing as a spot a light beam radiated from said semiconductor laser onto an information medium; focal displacement detection means for detecting a displacement between said spot and the surface of said information medium; and focal displacement correction means responsive to an output signal from said focal displacement detection means for correcting a displacement between said spot and the surface of said information medium; wherein at least part of a reflected light beam from said information medium is returned to said semiconductor laser, and said focusing lens has chromatic aberration and focuses said spot onto a different position along the optical axis of said focusing lens in association with a different laser wavelength.

5. An autofocusing control system according to claim 4, wherein said focusing lens is of a nature that a focused position displacement of said spot per wavelength shift of 1 nm is smaller than $$\frac{3}{2} \frac{\lambda}{NA^2},$$

wherein λ represents a center wavelength of said semiconductor laser, and NA represents a numerical aperture of said focusing lens.

6. An autofocusing control system according to claim 5, wherein the quantity of returning light to said semiconductor laser is more than 5%, and said focusing lens is of a nature that a focused position displacement of said spot per wavelength shift of 1 nm is larger than $$\frac{1}{20} \frac{\lambda}{NA^2}.$$

7. An autofocusing control system according to claim 5, wherein the quantity of returning light to said semiconductor laser is within 1 to 5%, and said focusing lens is of a nature that a focused position displacement of said spot per wavelength shift of 1 nm is larger than $$\frac{1}{10} \frac{\lambda}{NA^2}.$$

8. An autofocusing control system according to claim 5, wherein the quantity of returning light to said semiconductor laser is within 0.5 to 1%, and said focusing lens is of a nature that a focused position displacement of said spot per wavelength shift of 1 nm is larger than $$\frac{1}{5} \frac{\lambda}{NA^2}.$$

9. An autofocusing control system according to claim 4, wherein said focusing lens comprises a plurality of combination lenses.

10. An autofocusing control system according to claim 9, wherein said combination lens comprises a convex lens made of material with a small Abbe number and a concave lens made of material with a large Abbe number.

11. An autofocusing control system according to claim 4, wherein said focusing lens is a Fresnel zone plate lens.

12. An autofocusing control system according to claim 4, wherein said focusing lens is a hologram lens.

13. An autofocusing control system according to claim 4, wherein said focal displacement detection means detects a coarse displacement between said spot and the surface of said information medium, and said focal displacement correction means is responsive to the output signal from said focal displacement detection means for correcting the coarse displacement said spot and the surface of said information medium, said semiconductor laser being responsive to the part of the reflected light beam from said information medium returned thereto for more strongly emitting a laser wavelength different from that initially emitted when a displacement is present between said spot and the surface of said information medium, said focusing lens focusing said spot onto a different position along the optical axis of said focusing lens in association with the different wavelength emitted by said semiconductor laser.

* * * * *